United States Patent [19]

Dailey

[11] Patent Number: 5,164,826
[45] Date of Patent: Nov. 17, 1992

[54] METHOD AND APPARATUS FOR VISUAL INSPECTION OF THE INTERNAL STRUCTURE OF APPARATUS THROUGH INTERNAL PASSAGES

[75] Inventor: George F. Dailey, Plum Borough, Pa.

[73] Assignee: Westinghouse Electric Corp., Pittsburgh, Pa.

[21] Appl. No.: 747,044

[22] Filed: Aug. 19, 1991

[51] Int. Cl.⁵ .............................................. H04N 7/18
[52] U.S. Cl. ....................................... 358/100; 358/93
[58] Field of Search ...................... 358/100, 98, 99, 93, 358/107

[56] References Cited

U.S. PATENT DOCUMENTS

| | | |
|---|---|---|
| 3,557,780 | 1/1971 | Sato . |
| 3,669,098 | 6/1972 | Takahashi . |
| 4,651,558 | 3/1987 | Martin et al. ................... 358/100 X |
| 4,677,472 | 6/1987 | Wood .................................. 358/100 |
| 4,700,693 | 10/1987 | Lia et al. . |
| 4,794,912 | 1/1989 | Lia . |
| 4,803,563 | 2/1989 | Dailey et al. . |
| 4,811,091 | 3/1989 | Morrison et al. . |
| 4,889,000 | 12/1989 | Jaafar et al. . |
| 4,962,660 | 10/1990 | Dailey et al. . |
| 4,962,751 | 10/1990 | Krauter . |
| 4,991,006 | 2/1991 | Wood .................................. 358/100 |
| 5,020,234 | 6/1991 | Alkire et al. . |

*Primary Examiner*—Victor R. Kostak
*Attorney, Agent, or Firm*—M. G. Panian

[57] ABSTRACT

The internal structure of an apparatus with internal passages such as a steam turbine is inspected without dismantling by inserting a compact robotic carriage device into a steam pipe and remotely controlling the carriage to carry a video probe to a restricted passage such as a nozzle block and to extend the probe relative to the carriage to inspect features within the restricted passage such as turbine blades. Separate motor drives for each side of the carriage include drive wheels of slightly greater diameter than a timing belt which serves as a tractor tread to drive the carriage over obstacles not bridged by the wheels. A large permanent magnet between the wheels is retained within the carriage by front and rear axles and secures the carriage to the pipe walls in all orientations. The fixed size of the device is minimized by housing a motor for extending the probe relative to the carriage in a module cantilevered from the carriage by a preloaded compression spring. The single plane of articulation of the video probe is rotated by a torsion cable connected to the probe lead just behind the carriage.

14 Claims, 3 Drawing Sheets

METHOD AND APPARATUS FOR VISUAL INSPECTION OF THE INTERNAL STRUCTURE OF APPARATUS THROUGH INTERNAL PASSAGES

BACKGROUND OF INVENTION

1. Field of the Invention

This invention relates to visual inspection of the internal structure of large apparatus without dismantling by inserting a television probe into passages in the apparatus. In particular, the invention relates to devices for positioning the probe for viewing and includes a remotely controlled motorized carriage which carries the television probe through passages in apparatus such as a steam turbine and extends the probe for inspection of remote parts, such as the nozzle block and turbine blades.

2. Background Information

Typically large machines must be kept running to realize a return on investment, and in many instances, to provide a necessary continuous service. Hence, there has long been an interest in being able to inspect the internal structure of large machines without dismantling the apparatus, both for trouble shooting and for scheduling down time for preventative maintenance.

One such large machine is the steam turbine which drives an electrical generator to produce commercial power. Borescopes and, more recently, television probes have been used for this purpose. The television probes were originally developed for medical applications such as the remote inspection of internal passages in the human body. Very high resolution television cameras mounted on the ends of articulated probes have been developed for this purpose. Examples of such articulated probes, known as endoscopes, are disclosed in U.S. Pat. Nos. 3,557,780; 3,669,098; 4,700,693; 4,794,912; and 4,962,751.

While endoscopes with multiple bending axes have been developed for medical uses, they are not suitable for negotiating the long tortuous passages which lead to the critical parts such as the nozzle block and turbine blades inside a large steam turbine.

Remotely controlled carriages have been developed for inspecting the internal parts of machines such as turbine generators. U.S. Pat. No. 4,803,563 discloses a remotely controlled carriage for inspecting the stator of an electrical generator without removal of the rotor. This carriage is driven by several sets of wheels rectilinearly along the straight stator slots, and therefore does not require steering. A number of permanent magnets secure the carriage in the slots at all locations around the stator. The carriage carries a television camera for visual inspection of the stator as well as an eddy current detector. The camera is rather large and fixed on the carriage.

Commonly owned U.S. Pat. Nos. 4,889,000; 4,962,660 and 5,020,234 disclose additional carriages insertable in the stator slots of electric generators for performing various types of inspections. The carriages inserted in U.S. Pat. Nos. 4,962,660 and 5,020,234 mount a smaller television probe in a fixed position to observe the operation of an impact device and mechanical probe, respectively.

Commonly owned U.S. Pat. No. 4,811,091 discloses an inspection carriage which is remotely steerable through the stator ducts of a turbine generator. Separate motors drive wheels on each side of the carriage to effect steering. A television probe fixed on the carriage is aimed by maneuvering the entire carriage. The carriage is articulated for climbing over obstructions in the ducts, and also carries a number of permanent magnets which give it traction for climbing vertical walls of the metal ducts.

These known remotely controlled inspection devices are too large to reach the locations to be inspected in apparatus such as a steam turbine, and do not have the capability of maneuvering the television probe independently of the carriage to insert the probe into small openings, such as the spacing between turbine blades and other tights spots within a steam turbine.

There remains a need, therefore, for an improved device and technique for inspecting the internal structure of apparatus having internal passages without the need to dismantle the apparatus.

More specifically, there is a need for a device which can transport a video probe through the passages in the apparatus and extend the video probe into restricted passages to inspect selected internal features of the apparatus.

There is a related need for such a device for transporting the video probe which is small enough to maneuver in narrow passages of all orientations and can negotiate discontinuities in the passages.

SUMMARY OF THE INVENTION

These and other needs are satisfied by the invention which is directed to an inspection device insertable into the internal passages in an apparatus for inspection of internal features of the apparatus which includes a video probe comprising a video camera on a free end of an elongated flexible lead. The device further includes a carrier member carrying the video probe into the internal passages of the apparatus and positioning the video camera adjacent the internal feature to be inspected, and means extending the video probe relative to the video carrier member to align the video camera with the internal feature. More particularly, the carrier member comprises a motorized carriage having steerable drive means and a magnet which maintains the carriage in engagement with the ferromagnetic walls of internal passages in the apparatus. For use with a video probe which can be deflected in a only a single plane, the device includes means rotating the video probe to rotate the plane in which the probe is deflected to provide a full 180 spherical viewing degrees for the probe.

The carrier is very compact to reduce the overall fixed size of the device for maneuvering in small passages in the apparatus to be inspected. In a preferred form, the carriage has separate drive members extending along each side of the carriage and a large permanent magnet extending along substantially the length of the carriage between the separate drive members. In a particularly advantageous embodiment of the invention, the permanent magnet is retained in the carriage by forward and rearward axles shared by the two drive members. In order keep the fixed dimensions of the carriage small, a support module is cantilevered from the carriage by a flexible cantilevered mount, preferably in the form of a preloaded compression spring. This module can contain a motor driven mechanism for extending the probe relative to the carriage.

The invention includes the method of inspecting apparatus with internal passages by inserting carrier means into the passages carrying a video probe with a flexible lead extending back out of the passage to a monitoring device. The carrier means is maneuvered to position the video probe in alignment with a restrictive passage in the apparatus and then the probe is extended relative to the carriage so that the desired feature can be monitored remotely. The invention has particular application to the inspection of the internal structure of a steam turbine, and in particular, turbine blades such as, for example, the blades of the control stage turbine, and in addition to inspecting fixed structures such as the nozzle block.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
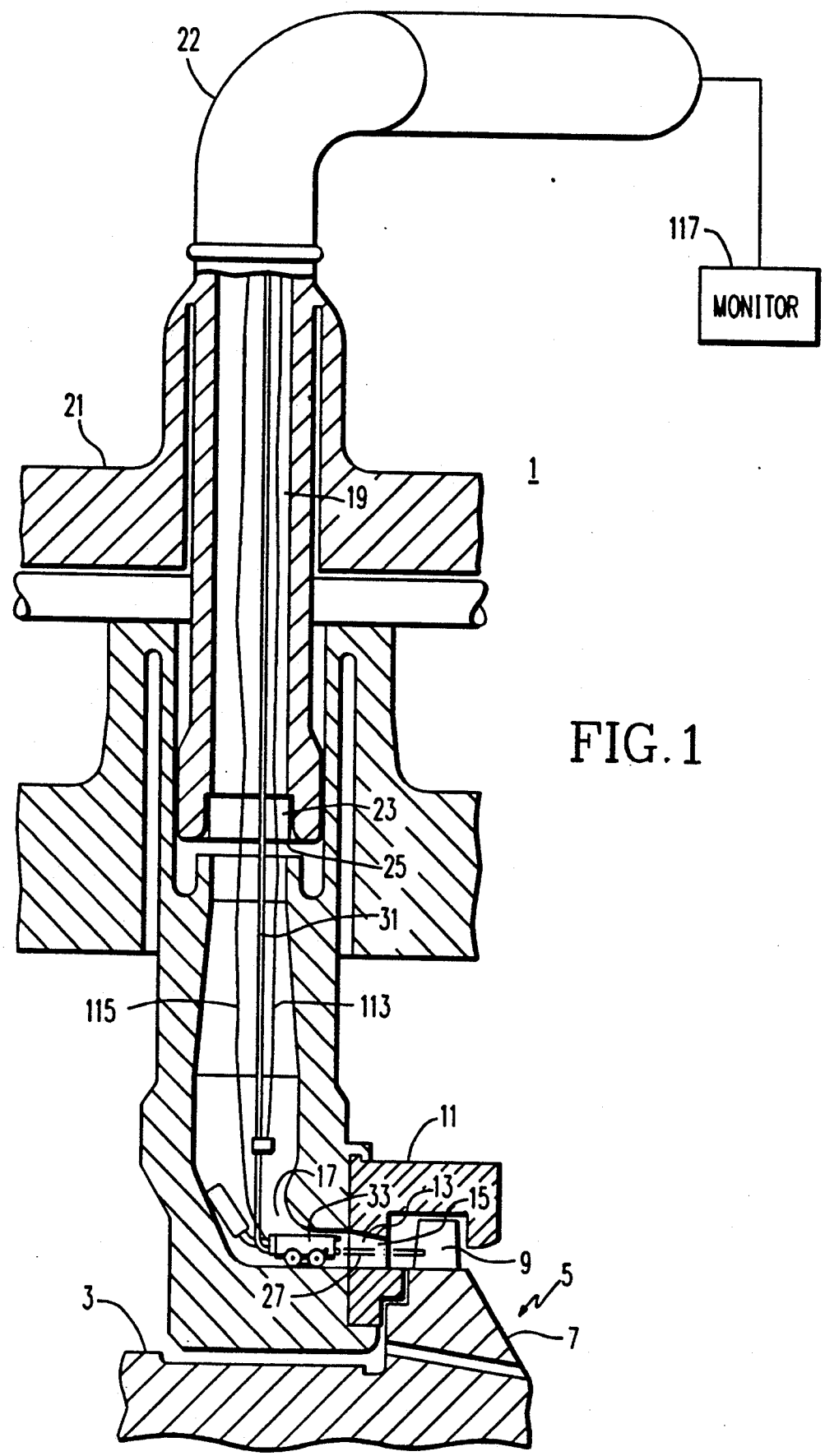
FIG. 1 is a fragmentary, longitudinal, vertical section through a steam turbine showing apparatus in position for inspecting internal features of the steam turbine in accordance with the invention.
Figure 2:
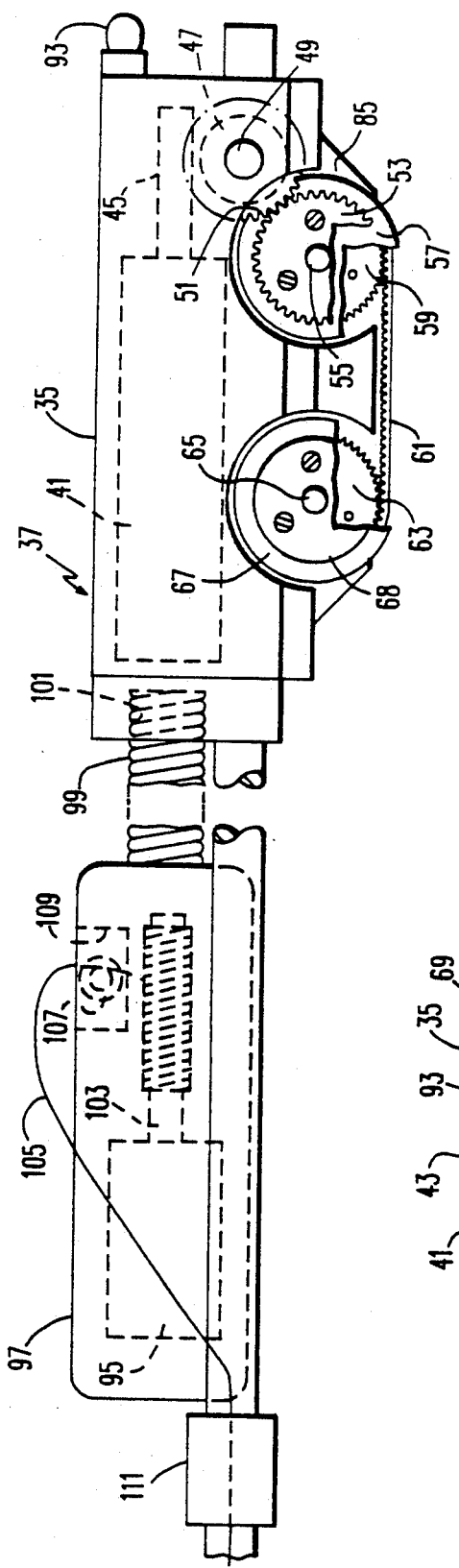
FIG. 2 is a side elevation views in enlarged scale of apparatus in accordance with the invention shown inspecting the turbine in FIG. 1.

FIG. 1 illustrates the internal structure of a portion of a typical steam turbine 1 used to drive an electrical generator (not shown) to produce commercial electrical power. While the invention will be described as used to inspect steam turbines, such as the turbine illustrated in FIG. 1, it will become clear as the description progresses that the invention has broader application to the inspection of the internal structures of other large machines or installations having internal passages. As in the case of the steam turbine, these passages need not be very large in cross-section, and may present a very tortuous path for the inspection device to reach the critical parts to be inspected.

The turbine 1 includes a rotor 3 having a control stage 5 which comprises a control stage turbine wheel 7 mounted on the rotor 3 and having a large number of turbine blades 9. The turbine 7 rotates adjacent a nozzle block 11 which has a number of passages 13 formed by stator vanes 15 which direct steam onto the blades 9 of the turbine wheel 7.

As is well known, the nozzle block 11 comprises a number of sectors which together form an annular nozzle section for the control stage 5. Each sector of the nozzle block 11 has its own inlet chamber 17 which distributes steam delivered to the sector by a steam pipe 19. The steam pipe 19 extends through the housing 21 of the turbine and is connected to a steam supply line 22. The steam pipe 19 is formed in sections and includes a bell seal 23 which forms an expandable connection between sections of the steam pipe. This bell seal 23 introduces into the steam pipe 19 an annular gap 25 which can be about a half inch in axial length.

FIG. 1 illustrates the section of the steam turbine at the upper most portion of the control stage 5. The bottom most sector (not shown) of the control stage 5 is fed steam through a steam pipe (also not shown) which extends downward from the top of the turbine, the same as the steam pipe 19 in FIG. 1, and then comes upward to enter the inlet chamber (not shown) for the lower most sector. The intermediate sectors of the control stage (also not shown) also have steam pipes which extend downward from the top of the turbine.

The object of the invention is to provide apparatus and a method by which the operator of the turbine 1 can inspect the control stage of the turbine and other sites within the turbine without the need to disassemble the machine. These sites can be inspected for signs of cracking, pitting, erosion, leading edge wear, or consequential damage. Such inspections would allow the operator to evaluate equipment condition and make budgeting and scheduling decisions about replacement. For example, the operator would have time to order a new nozzle block or set of turbine blades to have on hand and could plan appropriate outages to replace the damaged parts. Furthermore, operators experiencing efficiency loss, balancing problems, or vibration concerns would be able to make remote visual inspections for trouble shooting. For example, they could confirm suspected wear, blade loss, shroud breakage or foreign object presence. This capability of visual inspection for either outage planning or trouble shooting can have significant economic importance to the operator of the turbine.

Figure 3:
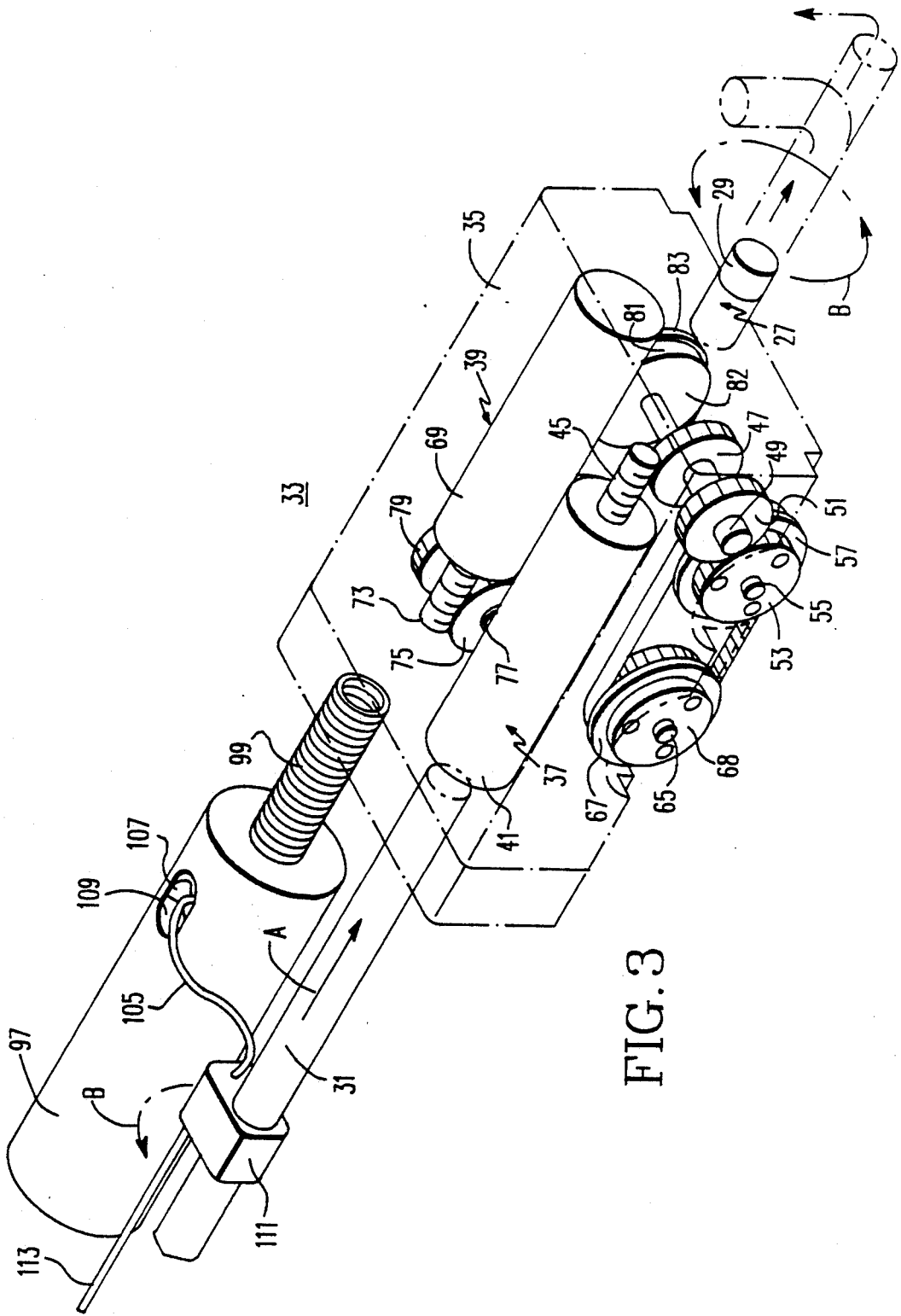
FIG. 3 is an isometric exploded view of the main carriage of the apparatus shown in FIG. 2.

In accordance with the invention, inspection of the internal structure of the turbine 1 is effected by a television probe 27 which includes a miniature television camera 29 on the end of a flexible lead 31 (see FIG. 3). As mentioned previously, such television probes have been developed for medical uses. The basic component of the television camera 29 is an area array of charge-coupled-devices, CCDs. The photosites are arranged in a matrix format and the opaque transport registers are located between the photosite columns. This precise location of photo sites enables precise identification of each component of the image signal. Additionally, the large number of pixel elements typically 31,590 (162×195), produces high resolution video images. The small CCD video cameras now on the market are compact, light sensitive, low power and highly reliable. A CCD camera probe produced by the Welch-Allyn Company is only 6 mm in diameter with a 37 ft. articulating fiber optic cable video lead 31. This camera probe 29 is both small enough to be inserted into the turbine and long enough to reach critical components. Also a wide-angle viewing mirror can be attached.

However, no reliable means has been available to remotely transport and maneuver the camera probe 27 inside the turbine 1. In particular, at the control stage rotating blades 9, the camera probe 27 must be turned from vertical travel in the main steam inlet pipe 19 to horizontal travel in the axial nozzle block passageway 17. In addition, the position of the camera tip must be controllable so it can be turned to view specific areas. The small diameter video probe 27 only has two-way articulation (see FIG. 3). That is, if the probe is inserted horizontally (as shown in FIG. 3) it can be bent in only one plane, the vertical plane for example, to aim the camera tip upward, straight ahead, or downward. To achieve a 360° view requires rotating the entire length of the probe about its axis. However, the flexible lead 31 itself does not have sufficient torsional stiffness for direct rotation from outside the turbine.

The present invention is directed to a robotic carriage device 33 and a method of using the same to inspect the remote features of the turbine 1. The robotic carriage device 33 includes a non-magnetic body 35 which, for example, may be a one-piece glass-reinforced nylon housing. In the exemplary device, the housing 35 is 1.5" (3.81 mm) high, 2.88" (7.32 mm) long and 1.88" (4.78 mm) wide. Mounted in the housing 35 is a right hand drive 37 and a separate left hand drive 39. The right hand drive 37 includes a tubular dc motor 41 received in a longitudinal bore 43 extending along the upper right hand portion of the housing 35 (see FIG. 4). The dc motor 41 has a worm 45 which engages a worm gear 47 on a shaft 49 mounted in the left forward corner of the housing 35. A gear 51 on the shaft 49 engages the drive gear 53 mounted on a forward axle 55. A drive wheel 57 secured to the drive gear 53 is rotatably mounted on the front axle 55. A timing gear 59 secured to the drive wheel 57 also rotates on the front axle 55.

The timing gear 59 drives a timing belt 61 which engages a second timing gear 63 on a rear axle 65. A right rear wheel 67 mounted on the rear axle 65 is connected to and driven by the timing gear 63. Preferably, the drive wheels are made of a resin material such as for example polyurethane. A hub 68 is secured to the rear drive wheel 67.

The left hand drive 39 is similar to the drive 37, but is mounted on the other side of the housing 35 and faces in the opposite direction. This left hand drive 39 includes dc motor 69 inserted in the axle bore 71 and extending along the upper left side of the housing 35. The dc motor 69 has a worm 73 which engages a worm gear 75 on the shaft 77 to drive pinion gear 79. The pinion gear 79 engages a drive gear 80 on the rear axle 65 which is connected to a left rear drive wheel (not shown) which in turn is connected to a timing gear (also not shown) both rotatably mounted on the rear axle 65 to drive timing belt 81 which engages a timing gear 82 on the front axle 55 which in turn rotates a left front drive wheel 83 to which is affixed to hub 84.

A large neodymium magnet 85 is received in a cavity 87 in the bottom of the housing 35. This magnet extends substantially the length of the housing 35 and down between the left and right hand drives 37 and 39. The magnet 85 is retained in the cavity 87 by the front axle 55 and the rear axle 65 which pass through the magnet. This arrangement allows the largest possible magnet to be mounted on the housing 35 to develop the force necessary to generate traction for the carriage as it travels through the passages such as the vertical steam pipes in the steam turbine 1. In the exemplary embodiment of the invention, this magnet 85 is trapezoidal in shape and is about 2" (5.08 mm) in overall length, 0.79" (2 mm) in width and 0.50" (1.27 mm) high.

Figure 4:
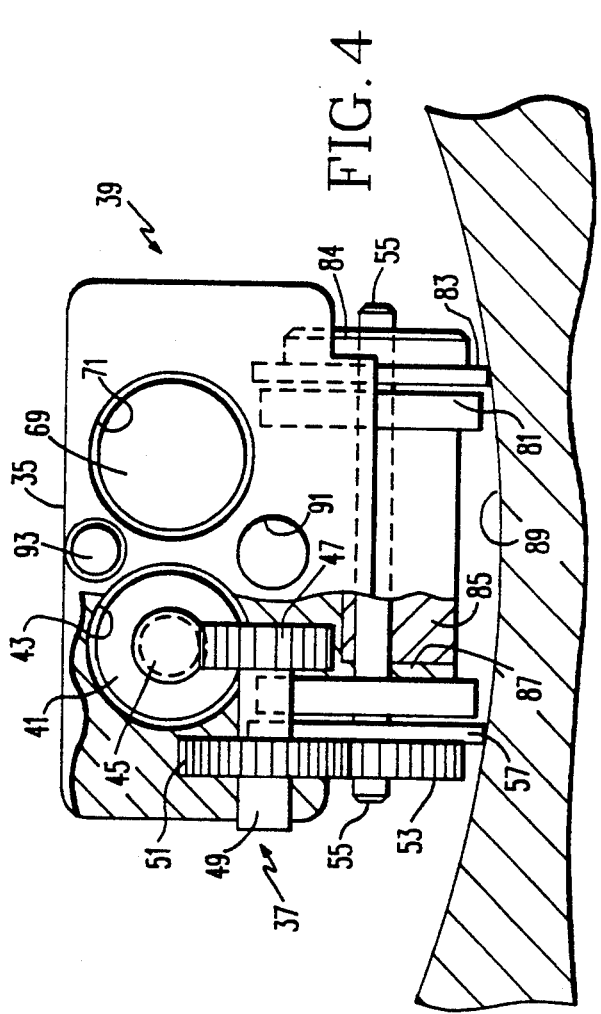
FIG. 4 is a fragmentary horizontal section through a portion of the steam turbine of FIG. 1 showing the apparatus of FIG. 2, partially in Section 1, positioned to make an inspection.

As can be seen from FIG. 4, the magnet 85 extends down under the carriage well below the axles 55 and 65 to minimize the gap between the magnet and the surface 89 of the passage in the steam turbine through which the remote camera device 33 is moving. The tread of the drive wheels such as 57 and 83 is kept narrow so that even where the surface 89 is curved such as in a pipe, the spacing between the magnet 85 and the surface 89 is kept short to maximize the traction force generated by the magnet.

The housing 35 has an axle bore 91 through which the lead 31 of the television probe extends. A lamp 93 mounted on the front of the housing 35 provides illumination for the television camera 29. The television probe 27 is advanced relative to the robotic charge device 33 by a third motor 95 carried in a cylindrical glass reinforced nylon module 97 which is cantilevered from the back of the housing 35 by a resilient cantilevered support in the form of a prestressed helical compression spring 99 which is received in recess 101 in the back of the housing 35. The motor 95 has a shaft 103 around which is wound a line 105. The line 105 is reeved over a pulley 107 in an opening 109 in the side of the module 97. The line 105 is connected to a coupling 111 secured to the lead 31 of the video probe 27. The coupling 111 is located behind the module 97 so that operation of the motor 95 winds up the line 105 to pull the coupling 111 toward the robotic carriage device 33 as indicated by the arrow A in FIG. 3. This feeds the television probe 27 through the bore 91 in the housing 35 to advance the video camera 29 beyond the carriage 33. The video probe 27 is retracted relative to the carriage by pulling on the lead 31 from outside of the turbine 1.

A torsion cable 113 is also connected to the coupling 111 and extends back out of the turbine through the steam pipe or other passage through which the television probe extends. The torsion cable 113 may be rotated outside the turbine to cause the coupling 111 to rotate, thereby causing the video probe 29 to rotate about a longitudinal axis of the lead 31 such as indicated by the arrows B in FIG. 3. Since the television probe 27 is equipped to bend in one plane as described previously, the rotation of the probe by way of the cable 113 allows that plane of articulation of the television probe to be rotated to any desirable position. In this way, the television camera 29 can be positioned through a full 180 spherical degrees.

For performing an inspection, for instance of the nozzle block and control stage turbine of a steam turbine 1, the robotic carriage device 33 is inserted in the steam pipe 19. The large magnet 85 secures the remote carriage device to the vertical walls of the steam pipe 19. The motors 41 and 69 of the remote carriage device 33 are operated to drive the robotic carriage device down the steam pipe 19. The timing belts 61 and 81 assure that both the front and rear wheels on both sides of the remote carriage device 33 are operated. The motors 41 and 69 are operated by a control system employing a joy stick such as the system disclosed in U.S. Pat. No. 4,811,091. By operating one motor to drive the vehicle in the forward direction and the other in the opposite direction, the robotic device can be made to change direction by rotating about a central vertical axis. This makes the robotic carriage device 33 suitable for maneuvering in the very tight confines of the internal passages in a steam turbine. Electrical leads 115 for energizing the motors extend out through the steam pipe 19 along with the flexible lead 31 of the video probe and the torsion cable 113.

As the remote carriage device 33 advances down the steam pipe 19 it carries with it the television probe 27. While normally the drive wheels such as 57 contact the surface of the steam turbine passage, the timing belts 61 and 81 serve as treads which assist the remote carriage device 33 in getting across obstacles within the passages in the steam turbine. For instance, the gap 25 in the bell seal 23 is bridged by the timing belts. For this purpose, it can seen that the timing gears such as 59 are sized relative to the drive wheels such as 57, so that the timing belt such as 61 is just lifted off a flat surface by the drive wheels. When the robotic carriage device 33 reaches the bottom of the steam pipe 19, it must turn sharply to enter the inlet chamber 17 of the control stage 5 of the turbine. A device which was long enough to accommodate the mechanism for advancing and retracting the probe as well as the left and right hand drives 37 and 39 would be too long to accommodate this abrupt change in direction in the steam passage. However, since the motor 95 for advancing the video probe is carried in the cantilevered module 97 which is resiliently mounted to the housing 35 by the spring 99, the module 97 is deflected as the robotic carriage device 33 transitions from the steam pipe to the inlet chamber 17.

The robotic carriage device 33 is maneuvered into alignment with a nozzle passage 13 between the vanes 15. This passage 13 is too small for the robotic carriage device to enter. However, by operating the motor 95, the video probe 27 is advanced through the nozzle passage and even between the turbine blades 9. The television probe can then be articulated from outside the turbine to deflect the camera 29 off of the longitudinal axis of the probe. The torsion cable 113 can be rotated to adjust the plane of articulation of the video probe 27 in order to observe the desired features. The television probe 27 transmits images of the desired features out of the turbine 1 to a monitor 117 which can display, and/or record the images for analysis. Each of the blades 9 on the turbine wheel 7 can be inspected by retracting the probe and rotating the turbine wheel one blade before again advancing the probe. However, it is preferred to inspect the vanes 15 forming each of the nozzle passages 13, therefore, the robotic carriage device 33 is backed away from the nozzle block 11, turned to advance into or out of the plane of FIG. 1, and then turned again to align with the next nozzle passage 13. When inspection of one sector of the nozzle block and turbine has been completed, the robotic carriage device 33 is driven out of the steam pipe 19 and then inserted into a steam pipe for another sector of the nozzle block It is evident that the device and technique described here for inspecting the control stage 5 of the steam turbine 1, can be used for inspecting other internal features of the turbine 1, and in fact, for inspecting the internal structure of many other large machines or installations with internal passages.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An inspection device insertable into internal passages defined by walls of ferromagnetic material in an apparatus for inspection of internal features of said apparatus, said device comprising:
   a video probe comprising a video camera on a free end of an elongated flexible lead;
   a motorized carriage having steerable drive means carrying said video probe into said internal passages and positioning said video camera adjacent to said internal feature to be inspected;
   magnet means maintaining said carriage in engagement with said walls of ferromagnetic material of said internal passages as said carriage moves through said passages; and
   means extending said video probe relative to said carriage to align said video camera with said internal feature.

2. The device of claim 1 wherein said video probe has a longitudinal axis and means deflecting said probe in a plane containing said longitudinal axis, and wherein said device includes means rotating said video probe about said longitudinal axis to rotate said plane in which said probe is deflected.

3. The device of claim 1 wherein said carriage has a length and a width selected to permit maneuvering of said carriage within said internal passages and wherein said steerable drive means comprises first drive members along a first side of said carriage and second drive members along a second side of said carriage, and wherein said magnet means comprises a permanent magnet extending along substantially the length of said carriage between said first and second drive members.

4. The device of claim 3 wherein said first and second drive members share a forward axle and a rearward axle, said forward and rearward axles extending through said permanent magnet.

5. The device of claim 1 wherein said motorized carriage comprises a housing on which said steerable drive means are mounted, a cantilevered module, and a resilient cantilevered mount resiliently cantilevering said module from said housing.

6. The device of claim 5 wherein said resilient cantilever mount comprises a preloaded compression spring.

7. The device of claim 6 wherein said means extending said probe are carried by said cantilevered module.

8. The device of claim 1 wherein said steerable drive means includes;
   separate left and right drive means, each of which includes a front and a rear drive wheel having a selected diameter, and a timing belt mounted on front and rear timing gears connected to said drive wheels and having diameters smaller than said selected diameter of said drive wheels but positioning said timing belts below said carriage to contact and drive said carriage over obstacles which said drive wheels cannot bridge.

9. A method of inspecting the internal structure of an apparatus having internal passages which lead to restricted passages in which said features to be inspected are located, said methods comprising the steps of:
   inserting a motorized steerable carriage into said internal passages, said carriage carrying a video probe having a flexible lead which extends back out of said internal passage to a monitoring device;
   securing said carriage to the walls of said internal passages and remotely maneuvering said carriage to carry said video probe through said internal passages to position said video probe in alignment with said restrictive passage;
   extending said video probe from said carriage through said restricted passage to said feature to be monitored; and
   monitoring the condition of said feature from images transmitted to said monitor by said video probe over said flexible lead.

10. The method of claim 9 wherein securing said carriage comprises securing said motorized steerable carriage to the walls of said internal passages with a magnet.

11. The method of claim 10 wherein said video probe is extended from some carriage means by feeding said flexible lead through said carriage and wherein said video probe is retracted by pulling said flexible lead from outside said apparatus.

12. The method of claim 11 including remotely articulating said video probe in a single plane, and rotating a torsionally stiff cable connected to the flexible lead of said video probe adjacent said carriage and extending out of said internal passages to rotate the single plane in which said video probe is articulated.

13. A method of inspecting a steam generator having steam lines supplying steam through restricted internal passages to turbine wheels having turbine blades, said method comprising the steps of:

inserting a motorized steerable carriage through said steam lines to one of said restricted passages, said carriage having a magnet which holds the carriage to the steam pipe and carrying a video probe having a flexible lead which extends back out of said steam line to a monitoring device;

extending said video probe from said carriage through said restricted internal passage to said turbine wheel; and monitoring the condition of said blades of said turbine wheel from images transmitted to said monitor by said video probe over said flexible lead.

14. The method of claim 13 wherein said restricted passage is one of a plurality of circumferentially distributed control nozzles in a nozzle block, and said turbine is a control stage turbine, said carriage being remotely controlled to successively align said probe with a plurality of said control nozzles and extending said probe into said control nozzles to inspect the blades of said control stage turbine.

* * * * *